United States Patent
Shim et al.

(10) Patent No.: US 7,900,039 B2
(45) Date of Patent: Mar. 1, 2011

(54) TLS SESSION MANAGEMENT METHOD IN SUPL-BASED POSITIONING SYSTEM

(75) Inventors: Dong-Hee Shim, Seoul (KR); Youn-Sung Chu, Seoul (KR)

(73) Assignee: LG Electronics, Inc., Seoul (KR)

( * ) Notice: Subject to any disclaimer, the term of this patent is extended or adjusted under 35 U.S.C. 154(b) by 832 days.

(21) Appl. No.: 11/814,128

(22) PCT Filed: Jan. 9, 2006

(86) PCT No.: PCT/KR2006/000078
§ 371 (c)(1),
(2), (4) Date: Jul. 17, 2007

(87) PCT Pub. No.: WO2006/075856
PCT Pub. Date: Jul. 20, 2006

(65) Prior Publication Data
US 2008/0109650 A1    May 8, 2008

Related U.S. Application Data

(60) Provisional application No. 60/648,068, filed on Jan. 28, 2005.

(30) Foreign Application Priority Data

Jan. 17, 2005  (KR) .................. 10-2005-0004308
Dec. 28, 2005  (KR) .................. 10-2005-0132610

(51) Int. Cl.
*H04L 9/00* (2006.01)
*H04B 7/26* (2006.01)

(52) U.S. Cl. .................. 713/151; 380/272; 455/432.1; 455/433

(58) Field of Classification Search .................. 380/272
See application file for complete search history.

(56) References Cited

U.S. PATENT DOCUMENTS

| | | | | |
|---|---|---|---|---|
| 5,471,532 | A * | 11/1995 | Gardeck et al. | 380/272 |
| 7,275,157 | B2 * | 9/2007 | Cam Winget | 713/168 |
| 7,424,293 | B2 * | 9/2008 | Zhu | 455/432.1 |
| 2002/0112152 | A1 | 8/2002 | VanHeyningen et al. | |
| 2004/0008588 | A1 | 1/2004 | Minami et al. | |
| 2004/0168054 | A1 | 8/2004 | Halasz et al. | |
| 2005/0125493 | A1 * | 6/2005 | Chaskar et al. | 709/203 |
| 2006/0095767 | A1 * | 5/2006 | Krishnamurthi et al. | 713/168 |
| 2009/0104904 | A1 * | 4/2009 | Shim | 455/433 |

FOREIGN PATENT DOCUMENTS

KR  1020060025973  3/2006
KR  1020060013323  9/2006

* cited by examiner

*Primary Examiner* — Matthew B Smithers
(74) *Attorney, Agent, or Firm* — Lee, Hong, Degerman, Kang & Waimey (57) ABSTRACT

When a SET receives a positioning service from a V-SLP by performing a roaming from a H-SLP to the V-SLP in a SUPL-based positioning system, only a new TLS connection is generated using an abbreviated handshake protocol without generating a new TLS session after the roaming. That is, when opening a TLS session for ensuring security in a SUPL-based positioning method, in particular, when opening a new TLS session between the V-SLP (V-SPC) and the SET after opening the TLS session between the H-SLP and the SET, the key information having used in the previous TLS session is provided to the V-SLP to set a new TLS connection, thereby reducing a load of an entire system.

11 Claims, 8 Drawing Sheets

TLS SESSION MANAGEMENT METHOD IN SUPL-BASED POSITIONING SYSTEM

CROSS-REFERENCE TO RELATED APPLICATIONS

Pursuant to 35 U.S.C. §119, this application claims the benefit of earlier filing date and right of priority to International Application No. PCT/KR2006/000078, filed on Jan. 9, 2006, to Korean Application No. 10-2005-0132610, filed on Dec. 28, 2005, to Korean Application No. 10-2005-0004308, filed on Jan. 17, 2005, and to U.S. Provisional Application No. 60/648,068, filed on Jan. 28, 2005, the contents of all of which are hereby incorporated by reference herein in their entirety.

BACKGROUND OF THE INVENTION

1. Field of the Invention

The present invention relates to a Secure User Plane Location (SUPL) based positioning system, and particularly, to a TLS session management method for a SUPL roaming.

2. Background of the Related Art

In general, a mobile communications system has a function unit related to calculating of position of a mobile communications terminal in a mobile communications network, and thus provides a location service for transferring the location of the terminal to a certain entity periodically or according to a user's request.

Networks related to the location service have different structures according to an inner network structure of 3GPP or 3GPP2. The current location of the terminal can be calculated using a cell-ID method for transferring a cell ID to which the terminal belongs, a method in which a time taken by transferring a radio wave from a terminal to each base station is calculated and a location of the terminal is calculated using a triangulation, a method using Global Positioning System (GPS), and the like.

However, in order to provide location services to a user, considerable signaling and location information should be transferred between the mobile communications terminal and a location server. The so-called positioning technologies that have been standardized for providing such location services, namely, a location service based upon the location (position) of a mobile communications terminal, are undergoing rapid widespread dissemination. The technologies can typically be provided through a user plane and a control plane. A Secure User Plane Location (SUPL) protocol of the Open Mobile Alliance (OMA), which is well-known as an example of the positioning technologies, provides the location services through the user plane The SUPL protocol is an efficient method for transferring location information required for the location calculation of a mobile communications terminal. The SUPL protocol employs a user plane data bearer so as to transfer positioning assistance information such as Global Positioning System (GPS) assistance, and to carry positioning technology associated protocols between the mobile terminal and a network.

In general, in a positioning system, a SUPL network related to a location service roughly includes a SUPL agent, SUPL Location Platform (SLP) and SUPL Enabled Terminal (SET). The SUPL agent refers to a logical service access point using location information which is actually measured. The SLP refers to a SUPL service access point at a network portion where network resources are accessed to obtain location information. The SET refers to a device for communicating with the SUPL network using a SUPL interface, for instance, a User Equipment (UE) of the UMTS, a Mobile Station (MS) of GSM, a IS-95 MS, a laptop computer having a SET function, Personal Digital Assistances (PDAs) or the like. The SET may be various mobile communications terminals which access through a Wideband LAN (WLAN). The SET supports various procedures defined by the SUPL protocol by being connected to the network through the user plane bearer.

A network that a user has originally registered in a positioning service is referred to as a home network. When a user moves and thus is located at another area which is not in the home network area, the corresponding area is referred to as a visited network. Therefore, the SLP within the home network is called as a Home-SLP (H-SLP), and the SLP within the visited network is called as a Visited-SLP (V-SLP). Here, upon initiating SUPL procedures at the network, an SLP to which an external client is initially connected is referred to as a Requesting SLP (R-SLP). The R-SLP is a logical entity which may be either the same as the H-SLP or not. In addition, an SET which targets a current positioning (i.e., location tracking) is defined as a target SET.

Furthermore, the SLP, as a network element, may include a SUPL Positioning Center (SPC) which is an entity for calculating an actual location, and a SUPL Location Center (SLC) which manages a function of the SLP other than calculating positioning, for example, functions of roaming and resource management. Therefore, the SET may calculate the positioning through a communication with the SPC via the SLC (i.e., proxy mode), and may calculate the positioning by directly connecting to the SPC (i.e., non-proxy mode).

However, upon opening a Transport Layer Security (TLS) session for ensuring security in a related art SUPL-based positioning (i.e., location tracking) method, in case of the non-proxy mode roaming, when opening a new TLS session between a V-SPC and a terminal after generating the TLS session, a new TLS session must be generated aside from the existing TLS session (i.e., the session between the H-SLP and the SET).

Figure 1:
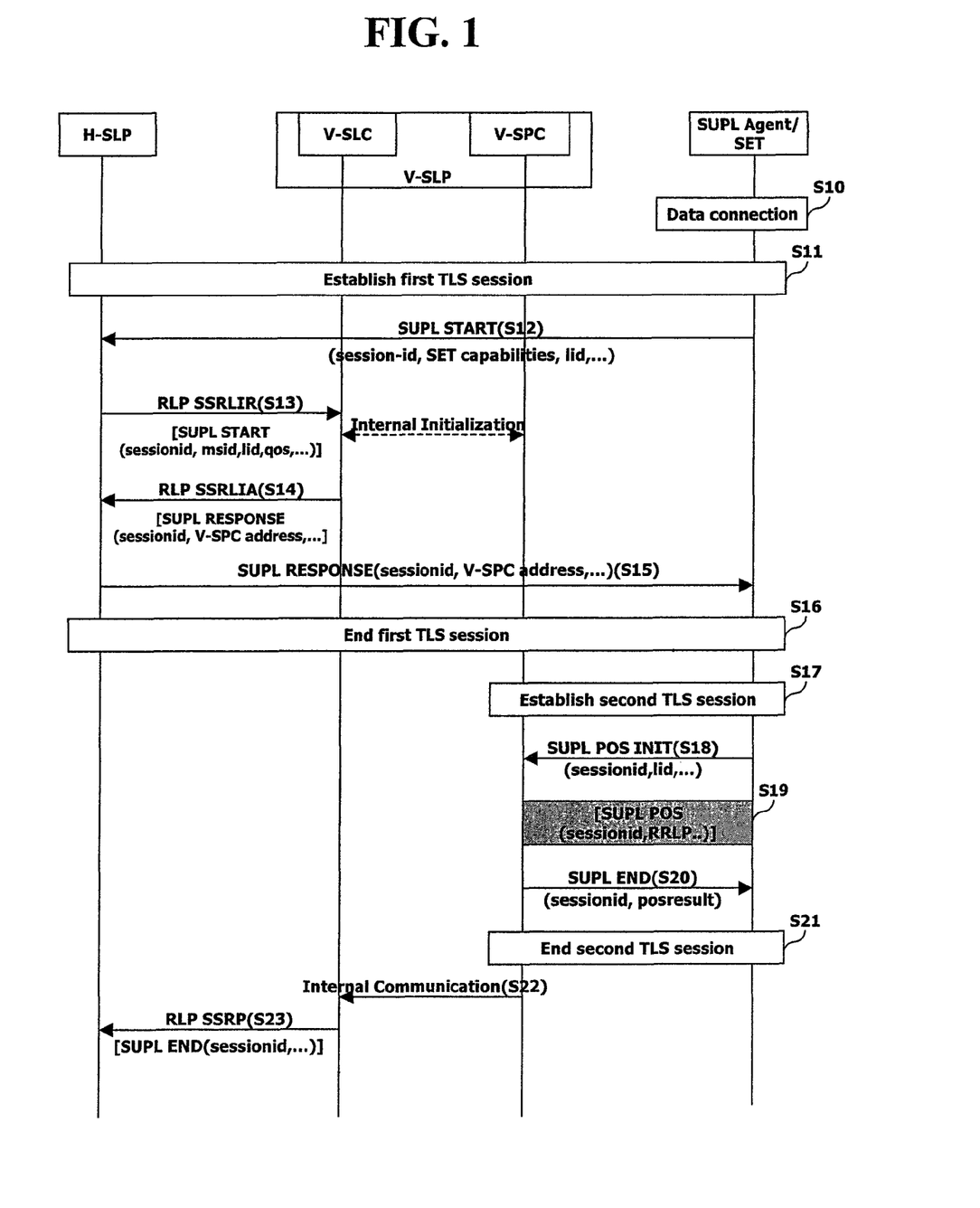
FIG. 1 illustrates a positioning procedure using a SUPL when a SET performs a roaming.

FIG. 1 illustrates a procedure for performing positioning using a SUPL when an SET executes a roaming from a H-SLP to a V-SLP. Hereinafter, a target SET is just referred to as the SET.

As illustrated in FIG. 1, if a data connection is not currently set between the SET and any network before transmitting a SUPL START message, the SET (or SUPL agent) requests a data connection (TCP connection) to a packet data network or a circuit switched network (e.g., a network of 3GPP or 3GPP2) (S10).

When the data connection is completed, the SET sets a TLS session (encryption protocol) with the H-SLP (S11). The SET then transmits a SUPL START message to the H-SLP to initiate a SUPL procedure therewith (S12). The SUPL START message may include at least session-id, SET capabilities and Local Identification (lid). The SET capabilities may include positioning (location tracking) methods supported by the SET (e.g., A-GPS supported by SET, SET-based A-GPS, etc), protocols to be used for the positioning (e.g., RRLP, RRC or TIA-801), and the like.

The H-SLP determines whether the SET is in a roaming state based upon routing information to thereafter transfer the SUPL ATART message including session-id and msid to the V-SLC of the V-SLP through an RLP Standard SUPL Roaming Location Immediate Request (SSRLIR) (S13).

The V-SLC informs the V-SPC through an internal initialization with the V-SPC that a SUPL POS procedure preparation is to be started, and switches required information with the V-SPC. Also, the V-SLC transfers a SUPL RESPONSE message including a V-SPC address or the like to the H-SLP through an RLP Standard SUPL Roaming Location Immediate Answer (SSRLIA) (S14).

Accordingly, the H-SLP transmits a SUPL RESPONSE message including at least session-id, the V-SPC address to the SET (S15). The SET terminates an IP connection with the H-SLP and also terminates the first TLS session (S16).

Afterwards, the SET sets a second TLS session with the V-SPC (S17).

The setting of the second TLS session is basically the same as the setting of the first TLS session. Upon setting the second TLS session, the SET transmits a SUPL POS INIT message including session-id, lid, SET capabilities, and the like to the V-SPC, and thereafter starts an actual positioning associated procedure (S18). Accordingly, the SET and the V-SPC switch therewith consecutive messages for performing the actual positioning (S19), and thus the V-SPC (or SET) calculates the location of the SET through the messages.

Upon calculating the location of the SET, the V-SPC transmits a SUPL END message to the SET to notify the termination of the SUPL procedure. The SET having received the SUPL END message terminates the second TLS session with the V-SPC (S20 and S21).

The V-SPC also informs the V-SLC through the internal communication of the termination of the SUPL procedure and the calculated location value of the SET (S22). The V-SLC transmits the received information to the H-SLP through an RLP Standard SUPL Roaming Position (SSRP) message (S23).

Afterwards, when the SET executes the roaming, a method for setting the first and second TLS sessions will now be explained in more detail.

Figure 2:
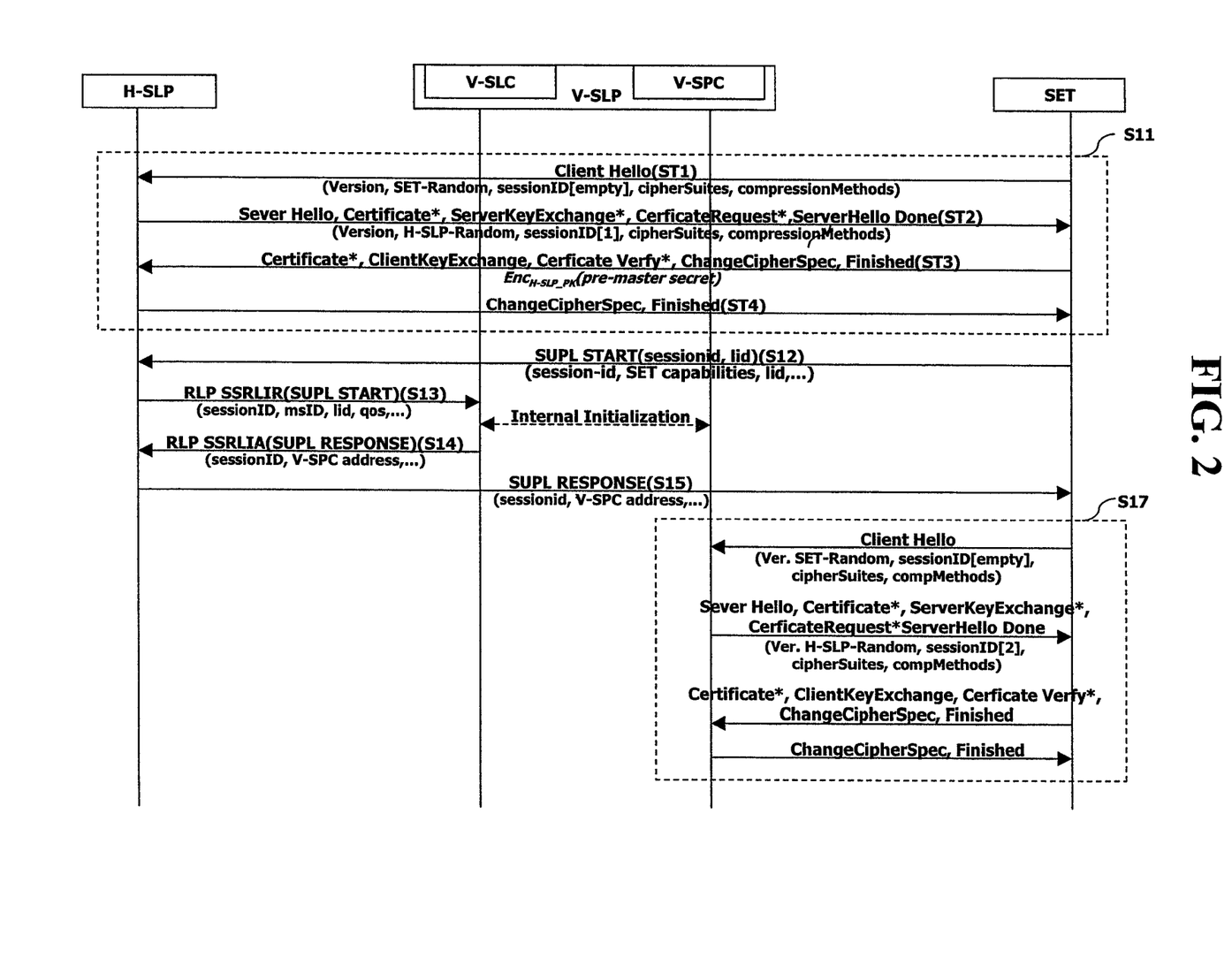
FIG. 2 illustrates a TLS session management method using a full handshake.

FIG. 2 illustrates in more detail the method (full handshake) for setting the TLS session (i.e., a method in which the SET performs a mutual authentication between the H-SLP and the V-SLP).

As illustrated in FIG. 2, the SET first sets a first TLS session (encryption protocol) with the H-SLP (S11).

That is, the SET includes parameters such as Version, RandomNumber, sessionID[empty], CipherSuites and CompressionMethod in a Client Hello message to thus transmit it the H-SLP (ST1). Here, the sessionID is set as 'empty' when generating a new session. The CipherSuites and CompressionMethod indicate a list of encryption parameters supported by the SET and an ID for a data compression method, respectively.

The H-SLP transmits a Server Hello message including parameters such as Version selected thereby, RandomNumber, sessionID[1], CipherSuites and CompressionMethod to the SET in response to the Client Hello message. If there is not the session ID transmitted by the SET, the H-SLP transmits an empty session ID to the SET.

The H-SLP sequentially transmits to the SET messages such as Certification*, ServerKeyExchange*, CertificateRequest* and ServerHello Done after sending the Server Hello message. Here, '*' denotes 'optional'.

The Certificate is a message to be transmitted posterior to the Server Hello message. The H-SLP transmits a public key thereof through a ServerKeyExchange or transmits the Certificate which includes the public key thereof and a root certificate of a Certificate Authority (CA) as a chain type.

The ServerKeyExchange is a message to be transmitted posterior to the Certificate. The ServerKeyExchange includes public key information of the H-SLP (server). Correct information related to the key information depends on a corresponding public key algorithm (e.g., RSA, Diffie-Hellman, or the like). The Certificate Request is a message to be transmitted posterior to the ServerKeyExchange. When requiring the public key information of the SET, the H-SLP uses the Certificate Request message in order to request a certificate. The ServerHello Done is a message to be transmitted posterior to the Certificate Request, and used in notifying the SET of the completion of an initial negotiation.

When the ServerHello Done is inputted from the H-SLP, the SET sequentially transmits to the H-SLP messages such as Certificate, ClientKeyExchange and CertificateVerify*, ChangeCipherSpec and Finished (ST3).

The ClientKeyExchange is a message to be transmitted after sending the Certificate, and includes key information ($Enc_{H-SLP\_PK}$(pre-master secret)) encrypted using the public key of the H-SLP. The key information denotes the most basic pre-master secret for making keys (Integrity Key, Ciphering Key, Initialization Vector, and the like) used for an actual encryption of the H-SLP. The corresponding key information is used in a symmetric encryption algorithm.

The CertificateVerify is a message to be transmitted posterior to the ClientKeyExchange. The CertificateVerify indicates whether the SET has a proper individual key with respect to the public key transmitted through the Certificate message. The CertificateVerify may include a value obtained by hashing and signing the key information of the SET and a content of the previous TLS handshake message.

At last, the H-SLP sequentially transmits ChangeCipherSpec and Finished messages, and terminates every full handshake procedures for setting the first TLS session (ST4). The ChangeCipherSpec is a message to be transmitted posterior to the CertificateVerify, and notifies a time point for performing encryption after terminating the negotiation between the H-SLP and the SET. Here, the SET changes the TLS session state from a pending state into a current state. The Finished is a message to be transmitted posterior to the ChangeCipherSpec. The Finished message indicates whether the negotiation is successfully completed or that damages have not occurred on security parameters during the negotiation.

According to such the procedures, upon setting the first TLS session, the SET transmits the SUPL START message to the H-SLP to notify an initiation of the SUPL procedure (S12). The H-SLP determines the location information of the V-SLP to which the SET belongs to thereafter recognize the roaming of the SET. The H-SLP then re-transfers the SUPL START message to the V-SLC through the RLP SSRLIR message (S13).

The V-SLC notifies the V-SPC of the initiation of the SUPL procedure through the internal initialization with the V-SPC and exchanges required information therewith. The V-SLC transfers the SUPL RESPONSE message including the V-SPC address to the H-SLP through the RLP SSRLIA message, in response to the RLP SSRLIR message (S14). The H-SLP transmits the SUPL RESPONSE message to the SET.

Hence, the SET terminates the IP connection with the H-SLP and the first TLS session therewith, and performs the step S17 for setting the second TLS session with the V-SPC.

That is, in the SUPL-based positioning system, when the SET performs the roaming from the H-SLP to the V-SLP to receive the positioning service from a new location server (V-SPC), a new TLS session should be generated between the SET and the V-SPC. In this case, the parameters having set between the H-SLP and the SET such as key information for encryption, signature and integrity check should be newly set.

However, the procedure for setting the new (second) TLS session is the same as the procedure for setting the first TLS session as illustrated in FIG. 2. Accordingly, the terminal should initially set the TLS session with the H-SLP according to the full handshake for the mutual authentication, and thereafter should generate the new TLS session according to the same full handshake whenever the terminal roams to the V-SLP, which disadvantageously increases time and resources required for the switching of the authentication and encryption keys during the roaming.

BRIEF DESCRIPTION OF THE INVENTION

Therefore, an object of the present invention is to provide a TLS session management method capable of enlarging efficiency of a TLS session setup between a terminal and a V-SLP during a SUPL roaming.

To achieve these and other advantages and in accordance with the purpose of the present invention, as embodied and broadly described herein, there is provided a TLS session management method in a roaming of a SUPL-based positioning system using a TLS comprising: setting a TLS session between a terminal and a Home-SUPL Location Platform (H-SLP), and transmitting a SUPL START message from the terminal to the H-SLP; transferring the set TLS session information from the H-SLP to the Visited-SLP (V-SLP) to which the terminal roams; transferring the V-SLP information from the H-SLP to the terminal; and setting a new TLS connection in the TLS session between the terminal and the V-SLP using the TLS session information.

Preferably, the TLS session information may include a TLS session ID used upon connecting the TLS session between the H-SLP and the terminal and master secret or roaming-master secret which is key information of the TLS session.

Preferably, the TLS session information may further include parameters indicating an encryption method and a compression method having used upon connecting the TLS session between the H-SLP and the terminal.

Preferably, the master secret is generated by applying a value obtained by concatenating a pre-master secret with an arbitrary value which is known between the terminal and the H-SLP to a pseudo random function.

Preferably, the roaming-master secret is generated by hashing a value obtained by concatenating the master secret with a roaming count.

Preferably, the TLS session is performed according to a full handshake protocol.

Preferably, the new TLS connection is generated by an abbreviated handshake procedure.

Preferably, upon setting the new TLS connection, the TLS session management method may further comprise performing the SUPL positioning procedure between the V-SLP and SET to calculate a location of the SET.

Preferably, the abbreviated handshake procedure may include: transmitting a Client Hello message including Version, SET-Random, and sessionID from the SET to the V-SPC; sequentially transmitting a Server Hello message including Version, V-SLP-Random and sessionID, a Change-CipherSpec message and a Finished message from the V-SPC to the SET; and when the Finished message is inputted from the V-SPC, sequentially transmitting the ChangeCipherSpec and Finished messages from the SET to the V-SPC to terminate the abbreviated handshake procedure.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

The present invention proposes a method for performing authentication and switching encryption keys using a TLS session which has previously been generated between a SET and a H-SLP before roaming in case that the SET performs the roaming from the H-SLP to a V-SLP to receive a positioning service from a new location server (V-SPC).

Figure 3:
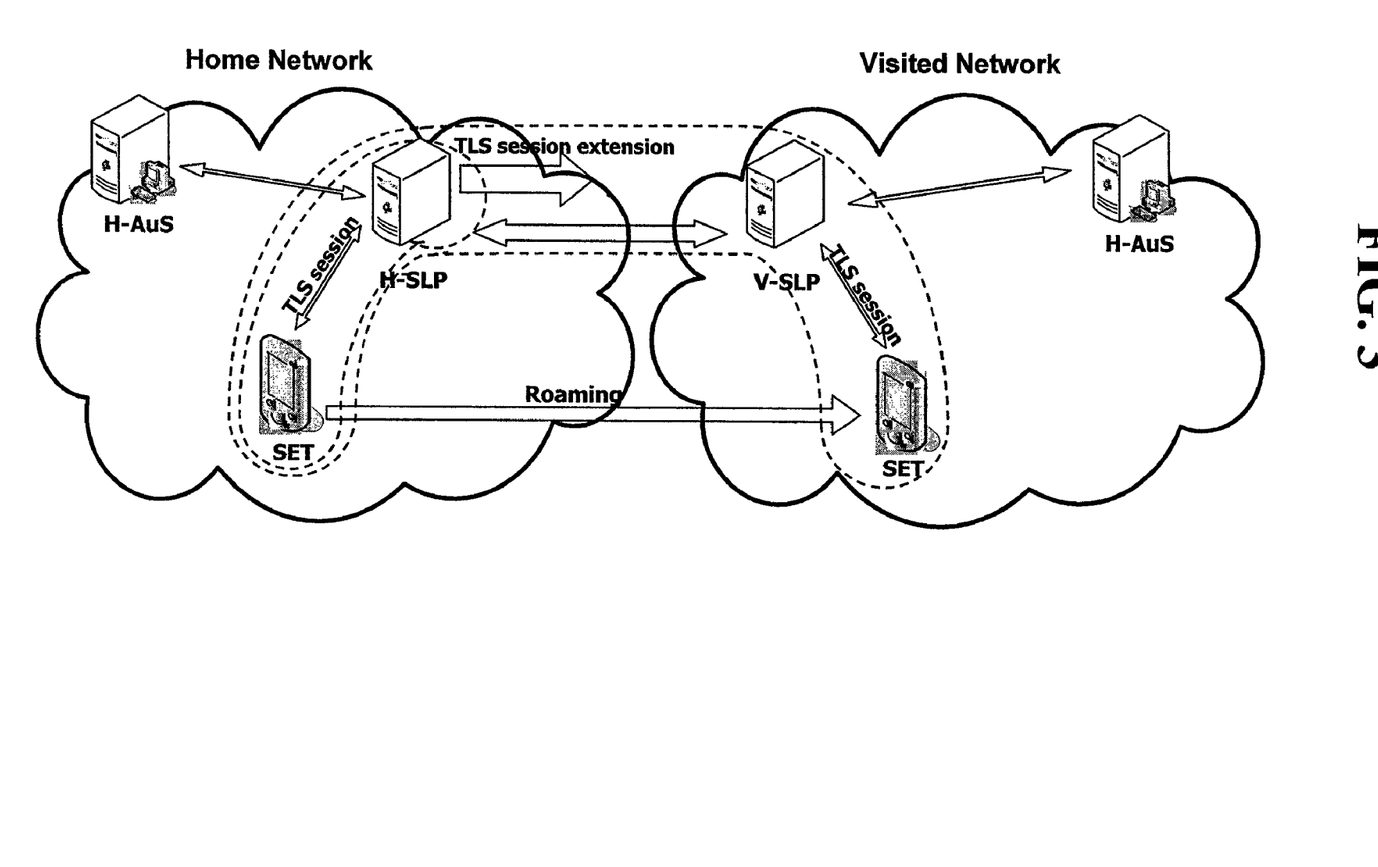
FIG. 3 illustrates an expansion of a TLS session for a SUPL roaming.

That is, as illustrated in FIG. 3, when the SET which generates a TLS session with the H-SLP at a home network roams to a Visited network, the TLS session generated between the H-SLP and the SET can extended as a TLS session between the V-SLP and the SET.

For this, the present invention does not generate a new TLS session during the roaming, but only generates a new TLS connection in the TLS session having generated between the SET and the H-SLP using an abbreviated handshake protocol.

In other words, in the present invention, in order to generate a new TLS connection during the roaming in a state that the SET terminates the TLS session with the H-SLP and thereafter does not yet generate a new TLS session with the V-SPC, information related to the TLS session which has been used is reused. Accordingly, the H-SLP includes parameters which have been used in the previous TLS session, a TLS session ID and new key information (i.e., master secret or roaming-master secret) within a RLP SSRLIR to transfer it to the V-SPC of the V-SLP.

Hence, when the SET sets a new TLS session, the SET transmits an empty session ID to the H-SLP. Upon generating a new connection using the previous TLS session, the SET includes a session ID to be desirably reused within a ClientHello message to transmit it to the V-SPC of the V-SLP. If the session ID transmitted from the SET can not be found, the V-SLP transmits an empty session ID as well as an error message to the SET. If there is the identical session ID, the V-SPC and the SET exchange a ChangeCipherSpec message therewith using the abbreviated handshake protocol. Upon reusing the TLS session using the abbreviated handshake protocol, the existing session state is maintained, and the TLS state is maintained as a pending state using the ChangeCipherSpec that the H-SLP and the SET have exchanged with each other.

Figure 4:
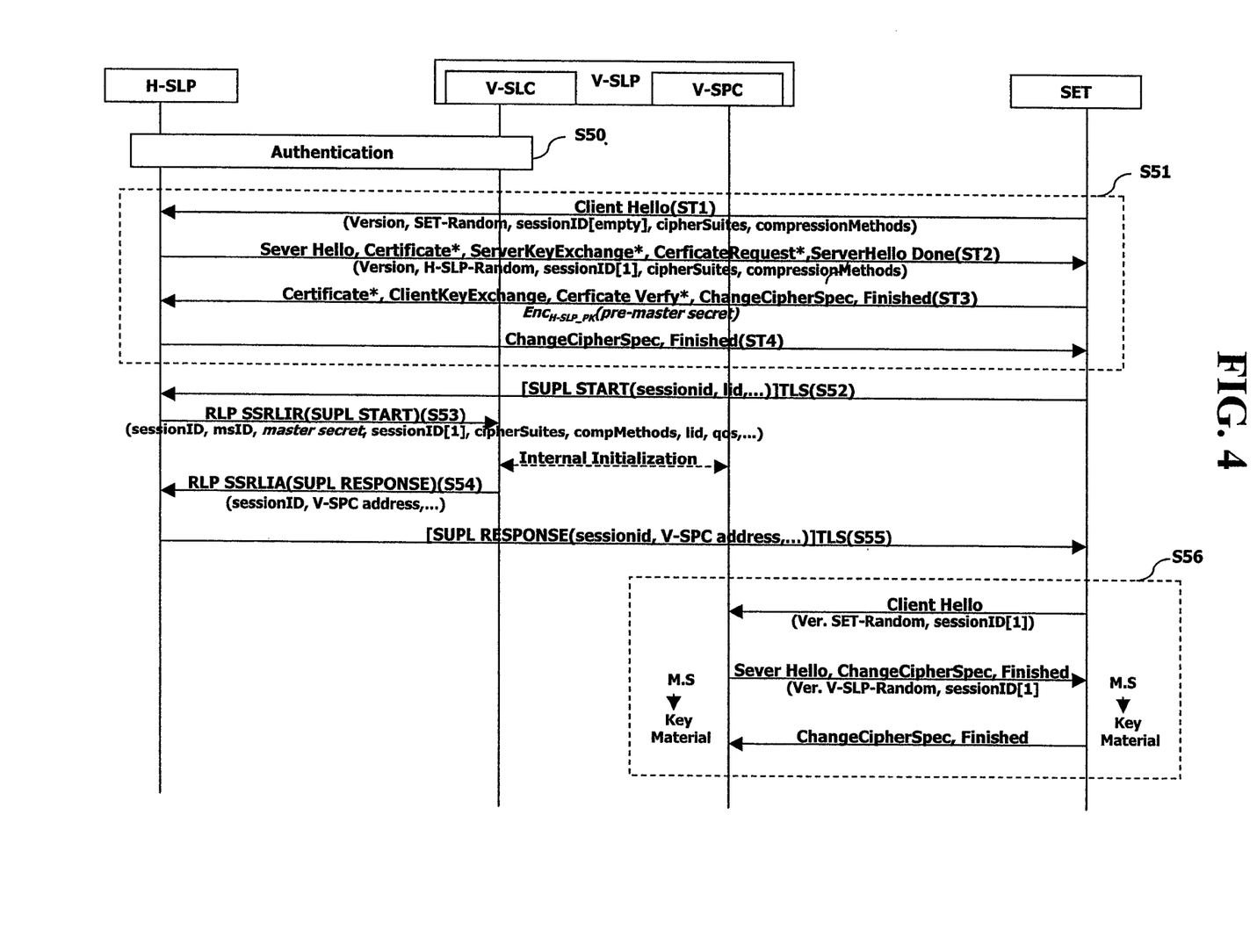
FIG. 4 illustrates a TLS session management method according to a first embodiment of the present invention.

FIG. 4 illustrates a TLS session management method in accordance with a first embodiment of the present invention, in which a master secret is used between the H-SLP and the V-SLP.

First, the H-SLP and the V-SLP perform a mutual authentication at a time point of initially negotiating a service support, and periodically verify a Certificate Revocation List (CRL) or verify a certificate using an Online Certificate Status Protocol (OCSP) (S50). Here, the H-SLP must authenticate at least the V-SLP to which the SET can roam, and must have a certificate of a plurality of V-SLPs.

In this state, the SET performs a first TLS session setting procedure with the H-SLP (S51). During the procedure, the SET generates a pre-master secret and then encrypts the corresponding generated pre-master secret using a public key of the H-SLP to thus transmit the encrypted pre-master secret to the H-SLP [transfer $Enc_{H\text{-}SLP\_PK}$(pre-master secret) (ST3). The pre-master secret refers to an original value required to generate a key used in encryption (ciphering key), a key used in an integrity check (integrity key) and an encryption initialization vector.

When the TLS session is set between the H-SLP and the SET, the SET transmits a SUPL START message to the H-SLP to initiate a SUPL procedure with the H-SLP (S52). The H-SLP determines positioning (location information) of the V-SLP to which the SET belongs based upon routing information to recognize a roaming of the SET.

When the SET roams to the V-SLP, the H-SLP transfers to the V-SLC TLS session information using a SUPL START message which is an RLP message (RLP SSRLIR) (S53). The corresponding TLS session information is transferred to the V-SPC through an internal communication. Here, the RLP message is transferred as an encrypted message type through a HTTPS (TLS). Here, parameters to be additionally included in the RLP SSRLIR (SUPL START) message will be seen as follows.

master secret, sessionID, cipher Suites, compression Methods: using in an expansion of TLS session between the V-SLC and the SET.

Here, the master secret refers to a PRF (pre-master secret, "master secret", SET Random|V-SLP-Random). The sessionID refers to a number of the TLS session to be reused, namely, a session number having used in the initial TLS session connection between the H-SLP and the SET.

The V-SLP transfers to the H-SLP a RLP SSRLIA (SUPL RESPONSE) message including the sessionID and a V-SPC address, and the like in response to the SUPL START message (S54). The H-SLP transmits a SUPL RESPONSE message (including a SUPL sessionID, the V-SPC address, and the like) to the SET. That is, the H-SLP informs the SET of the SUPL session number, the server (V-SPC) to receive a location service (S55).

Accordingly, even if the previous TLS session is terminated, the SET generates the TLS connection with the V-SPC using the abbreviated handshake protocol on the basis of the TLS session information which has been used upon initially setting the TLS session between the H-SLP and the SET (S56).

That is to say, the SET transmits to the V-SPC a Client Hello message including parameters such as Version, SET-Random, sessionID[1], and the like. The V-SPC transmits to the SET a Server Hello message including parameters such as a selected Version, V-SLP-Random and sessionID[1], and then transmits ChangeCipherSpec and Finished messages, which inform a time point for performing an encryption, after terminating the negotiation between the SET and the V-SPC.

When the Finished message is inputted from the V-SPC, the SET also sequentially transmits the ChangeCipherSpec and Finished messages, and accordingly terminates the whole abbreviated handshake procedure for setting the TLS connection.

Hence, the SET and the V-SPC can induce (generate) the encryption parameters using the parameters (SET-Random or V-SLP-Random) having exchanged with each other when performing the abbreviated handshake. Such induction (generation) process may identically use the following functional equations (1) and (2) provided at the previous TLS.

$$\text{master secret} = \text{PRF}(\text{pre-master secret, "master secret"}, \text{and SET-Random}|\text{V-SLP-Random}) \qquad (1)$$

$$\text{key material} = \text{PRF}(\text{master secret, "key expansion"}, \text{and V-SLP-Random}|\text{SET-Random}) \qquad (2)$$

Here, the "master secret" and the "key expansion" refer to strings.

Figure 5:
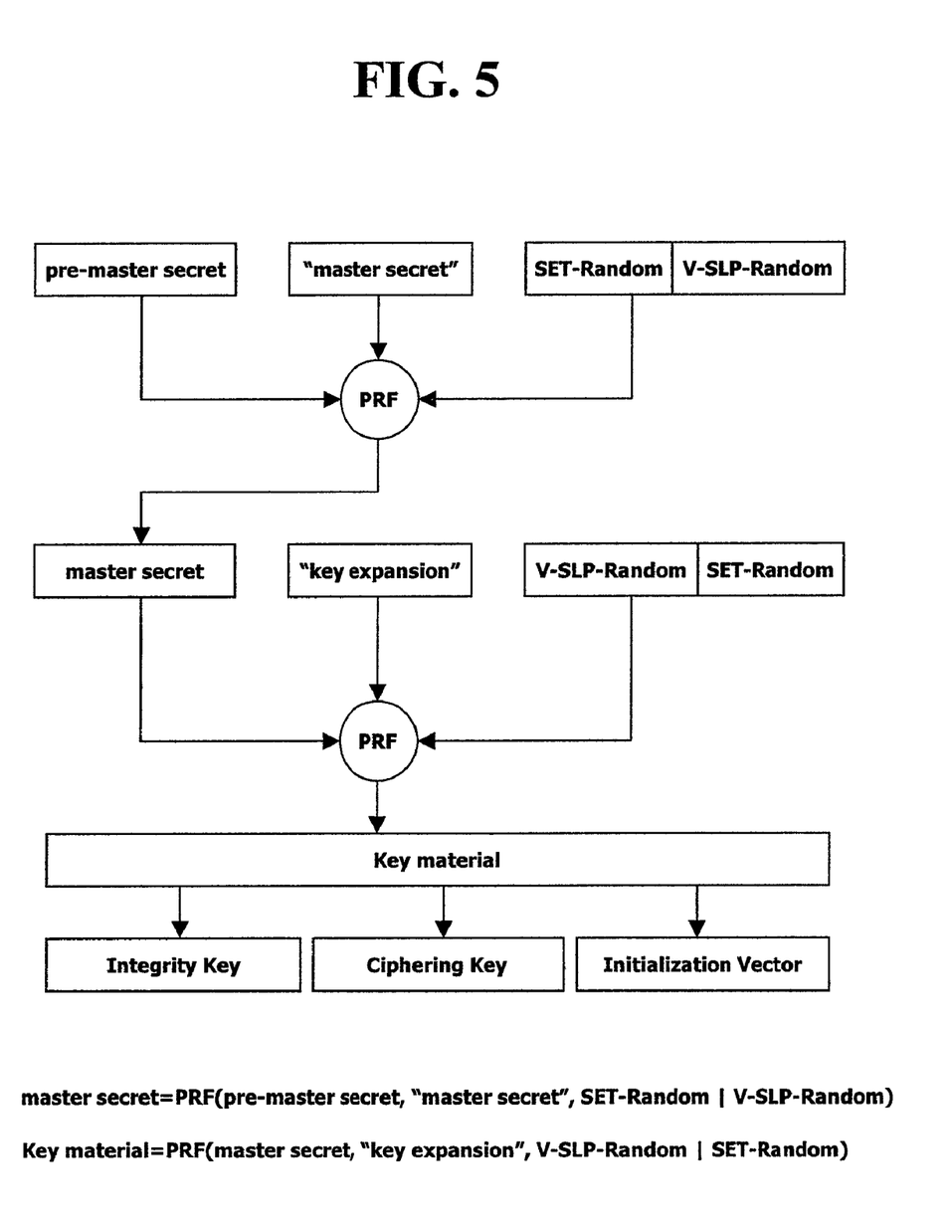
FIG. 5 illustrates a process for generating (inducing) encryption parameters.

FIG. 5 illustrates a method for generating (inducing) encryption parameters in the SET and the V-SPC.

As illustrate FIG. 5, the V-SPC applies the master secret transferred from the H-SLP, the "key expansion" which is the string for inducing keys differently for each connection, and the V-SLP-Random value to the pseudo random function (PRF), so as to obtain the key material as shown in the equation (2). The master secret is newly generated in every TLS session, and the key material is generated at every connection. Accordingly, the V-SLP finally obtains the integrity key, the ciphering key and the initialization vector all of which are used in the encryption transmission from the obtained key material.

Figure 6:
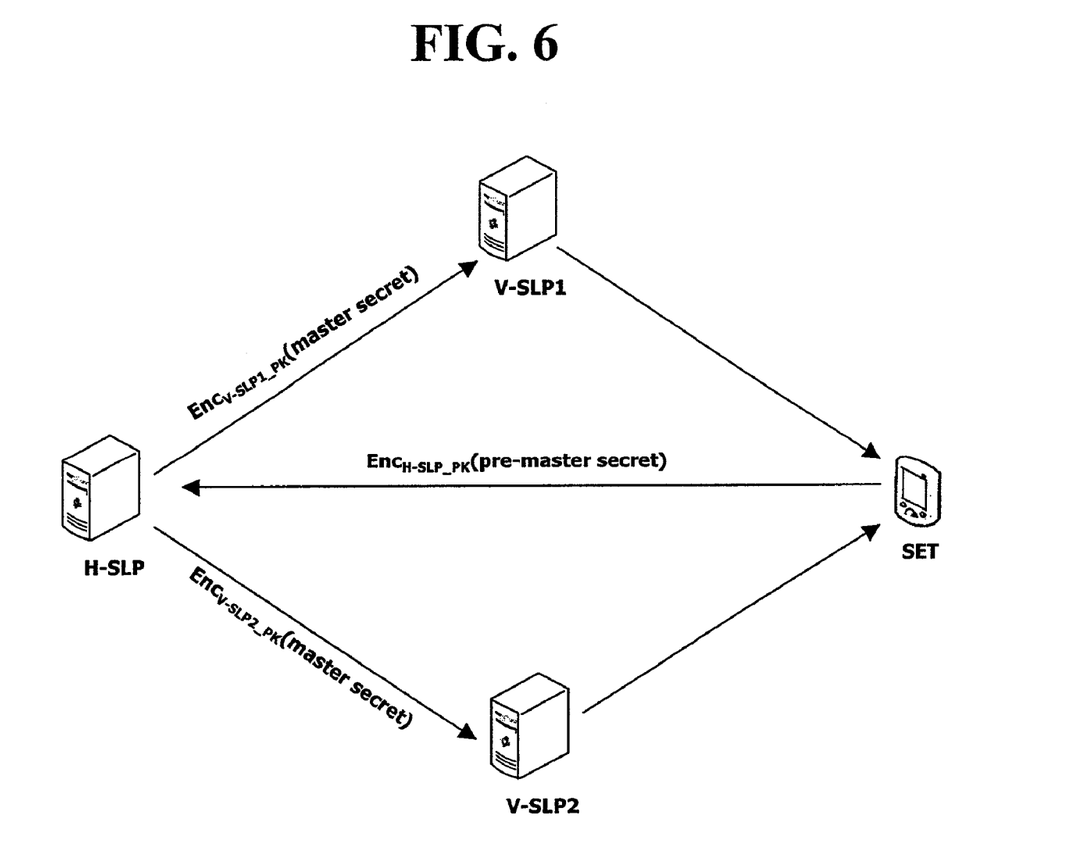
FIG. 6 illustrates a transmission of a master secret during a SUPL roaming.

FIG. 6 illustrates a transmission of a master secret during a SUPL roaming. In particular, FIG. 6 illustrates a master secret in each TLS session when the SET and V-SLPs share the master secret used between the H-SLP and the SET.

As illustrated in FIG. 6, a pre-master secret initially generated at the SET is transmitted to the H-SLP after being encrypted at the SET. When the SET roams to a V-SLP1 or V-SLP2, the H-SLP encrypts the master secret generated (induced) from the pre-master secret using a public key of each V-SLP2 or V-SLP2 for transmission thereof. Therefore, even if the V-SLP1 and the V-SLP2 receive the same pre-master secret from the SET, the V-SLP1 and the V-SLP2 receive different master secrets. Accordingly, a third party can not easily recognize the location of the SET in a session after the roaming as well as in the current session.

In another embodiment of the present invention, on the other side, a roaming-master secret may be transferred from the H-SLP to the V-SLP instead of the master secret during the SUPL roaming.

Figure 7:
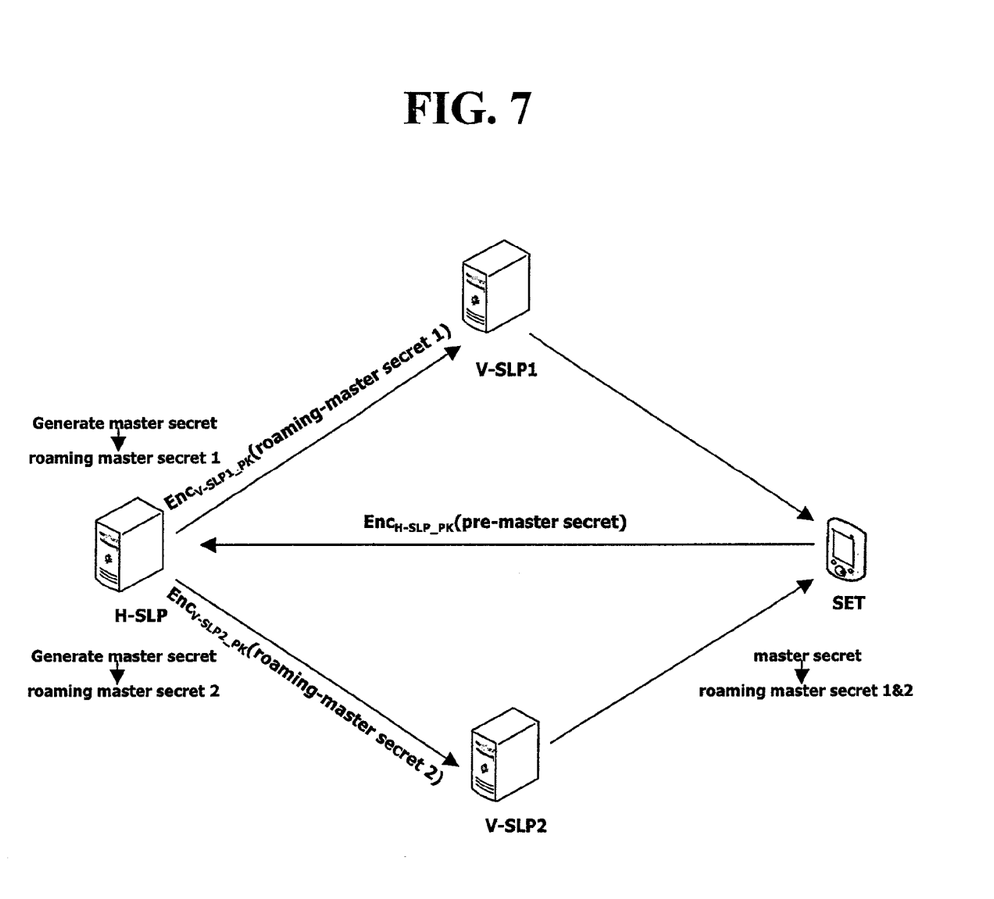
FIG. 7 illustrates a transmission of a roaming-master secret.

FIG. 7 illustrates a transmission of a roaming-master secret during the SUPL roaming. In particular, FIG. 7 illustrates the master secret and a roaming-master secret having used in each TLS session when the master secret used between the H-SLP and the SET is not transferred as it is but is changed into the roaming-master secret to thus be shared between the SET and the V-SLPs.

As illustrated in FIG. 7, when the SET roams to the V-SLP1 or V-SLP2, the H-SLP concatenates a roaming-count of the SET with the master secret induced (generated) from the pre-master secret received from the SET to thereafter perform a hashing calculation. The H-SLP then generates roaming-master secrets 1 and 2. The roaming-master secrets 1 and 2 are encrypted using the public keys of the V-SLP1 and the V-SLP2, respectively, to thereafter be transmitted.

Accordingly, even if the third party obtains the roaming-master secret 1 between the H-SLP and the V-SLP1 (or V-SLP2), the third party can not obtain the pre-master secret from the corresponding roaming-master secret 1, and thus the location of the SET may not easily be exposed. That is, the roaming-master secret is a value calculated by concatenating the roaming-count of the SET with the pre-master secret using a hash function such as SHA( ). The hash function has a unidirectionality, which makes it difficult to calculate the pre-master secret from the roaming-master secret.

Figure 8:
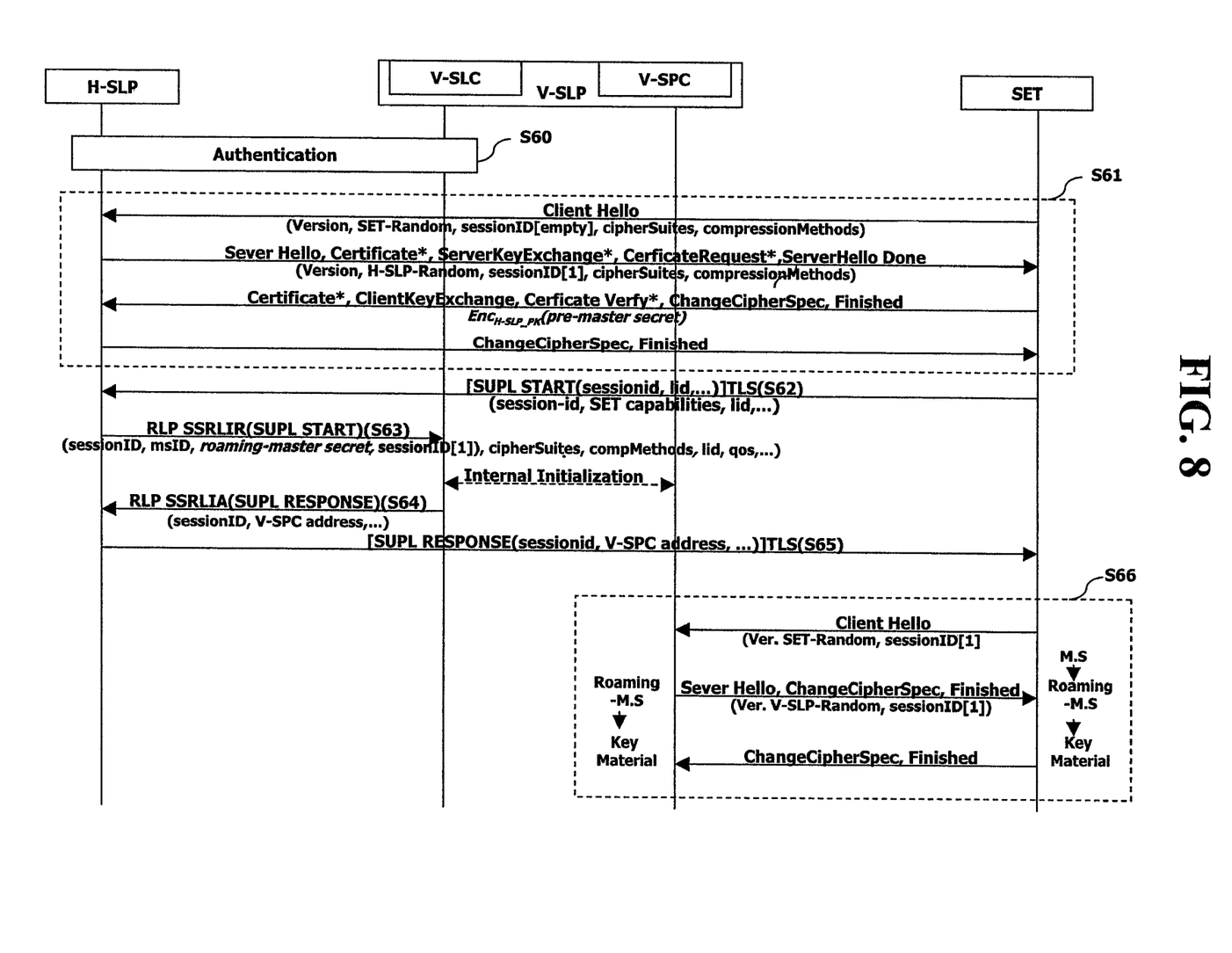
FIG. 8 illustrates a TLS session management method according to a second embodiment of the present invention.

FIG. 8 illustrates a TLS session management method in accordance with a second embodiment of the present invention, which shows a case of using a roaming-master secret between the H-SLP and the V-SLP. That is, in the second embodiment of the present invention, the master secret having used between the H-SLP and the SET is not used as it is, but the roaming-master secret (i.e., a value obtained by changing the master secret so as to be unable to know the master secret of the H-SLP in the V-SLC) is used. The roaming-master secret may be used such that the V-SLP can not know the master secret used in the previous TLS session between the H-SLP and the SET and also a TLS connection can be set.

As illustrated in FIG. 8, the H-SLP and the V-SLP perform a mutual authentication at a time point for initially negotiating a service supply, and periodically verify a Certificate Revocation List (CRL) or verify a certificate validity using an Online Certificate Status Protocol (OCSP) (S60). Here, the H-SLP must authenticate at least the V-SLP to which the SET can roam, and must have a certificate of a plurality of V-SLPs.

In this state, the SET performs a first TLS session setting procedure (S61). When performing the procedure, the SET encrypts the pre-master secret using a public key of the H-SLP for transmission. When the TLS session is set between the H-SLP and the SET, the SET transmits a SUPL START message to the H-SLP to initiate the SUPL procedure with the H-SLP (S62). The H-SLP determines positioning of the V-SLP to which the SET belongs on the basis of routing information to sense the roaming of the SET.

When the SET roams to the V-SLP, the H-SLP transfers TLS session information to the V-SLC using an RLP SSRLIR (SUPL START) message (S63). The V-SLC transfers the corresponding information to the V-SPC through an internal communication. Here, the RLP message is transferred as an encrypted message type through a HTTPS(TLS). Here, parameters to be added to the RLP SSRLIR message will be shown herebelow.

roaming-master secret, sessionID, cipher Suites, compression Methods: using in a TLS session expansion between the V-SLC and the SET.

The roaming-master secret indicates a value obtained by concatenating the master secret with the roaming-count to thereafter hash the concatenated value. The sessionID refers to a session number of the TLS session to be reused. The cipher Suites refers to an encryption method, and the compression Methods refers to a compression method.

$$\text{roaming-master secret=SHA(master secret|roaming-count)} \qquad (3)$$

Here, the roaming count denotes the number of times for the roaming generation.

Thus, in the second embodiment of the present invention, the master secret having used between the H-SLP and the SET but the roaming-master secret (i.e., a value obtained by changing the master secret so as to be unable to know the master secret of the H-SLP in the V-SLC) is used. The roaming-master secret may be used such that the V-SLP can not know the master secret used in the previous TLS session between the H-SLP and the SET and also a TLS connection can be set.

The V-SLP transfers an RLP SSRLIA(SUPL RESPONSE) message including sessionID, V-SPC address, and the like to the H-SLP, in response to the RLP SSRLIR message (S64). The H-SLP transmits a SUPL RESPONSE message (including SUPL sessionid, V-SPC address, etc.) to the SET. That is, the H-SLP informs the SET of the server (V-SPC) to receive the SUPL session number and the location service (S65).

Therefore, even if the previous TLS session is terminated, the SET reuses the TLS session information having used upon initially setting the TLS session between the H-SLP and the SET, to thus set the TLS connection with the V-SPC by performing the abbreviated handshake (S66).

That is, the SET transmits a Client Hello message including parameters such as Version, SET-Random, sessionID[1], and the like to the V-SPC. The V-SPC transmits a Server Hello message including parameters such as a selected Version, V-SLP-Random, sessionID[1] to the SET in response to the Client Hello message. After terminating the negotiation between the SET and the V-SPC, the V-SPC transmits ChangeCipherSpec and Finished messages which inform the time point of performing encryption.

When the Finished is inputted from the V-SPC, the SET also sequentially transmits the ChangeCipherSpec and Finished messages to the V-SPC, thereby terminating the entire abbreviated handshake procedure for setting the TLS connection.

Accordingly, when performing the abbreviated handshake, the SET and the V-SPC use the parameter values (SET-Random or V-SLP-Random) which they have exchanged with each other to induce (generate) the encryption parameters. Here, in the induction process of the encryption parameters, the PRF( ) provided in the same TLS session is used as follows.

key material=PRF(roaming-master secret, "key expansion", V-SPC|V-SPC-Random)

That is, the V-SPC obtains the key material by receiving the roaming-master secret from the V-SLC through an internal initialization therewith. The SET induces the roaming-master secret (roaming-M.S) from the master secret. Thereafter, the SET re-obtains the key material, which is then used in the encryption and integrity check.

As described above, in the present invention, when opening the TLS session for ensuring security in the SUPL-based positioning, in particular, when opening a new TLS session between the V-SPC of the V-SLP and the SET after opening the TLS session between the H-SLP and the SET, the key information having used in the previous TLS session is provided to the V-SLP, whereby it is possible to decrease time taken by setting the new TLS session from the initial process therefor, and accordingly it is effective to reduce a load of the entire system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of managing a Transport Layer Security (TLS) session in a Secure User Plane Location (SUPL)-based positioning system, the method comprising:
setting, by a Home SUPL Location Platform (H-SLP), the TLS session with a terminal, during which the H-SLP receives secret information from the terminal to be used for an encryption and an integrity check with respect to a new TLS connection of the TLS session;
receiving, by the H-SLP, a SUPL START message from the terminal;
determining, by the H-SLP, whether the terminal roams to a Visited SLP (V-SLP) based on routing information, wherein the V-SLP includes a Visited SUPL Location Center (V-SLC) and a Visited SUPL Positioning Center (V-SPC);
transferring, by the H-SLP to the V-SLC, TLS session information related to the set TLS session and the SUPL START message if it is determined that the terminal roams to the V-SLP;
transmitting, by the V-SLC to the V-SPC, the TLS session information; and
using, by the V-SPC, the TLS session information to set the new TLS connection with the terminal without exchanging further information for the encryption and the integrity check between the terminal and the V-SPC.

2. The method of claim 1,
wherein the TLS session information includes:
a TLS session ID used for setting the TLS session between the H-SLP and the terminal; and
wherein the secret information includes a master secret or a roaming-master secret for generating keys used for the encryption and the integrity check.

3. The method of claim 2, wherein the master secret is generated by applying a value obtained by concatenating a pre-master secret having an arbitrary value known between the terminal and the H-SLP to a pseudo random function.

4. The method of claim 2, wherein the roaming-master secret is generated by hashing a value obtained by concatenating the master secret with a roaming count.

5. The method of claim 1, wherein the TLS session information includes parameters indicating an encryption method and a compression method used for setting the TLS session between the H-SLP and the terminal.

6. The method of claim 1, wherein the TLS session comprises performing a full handshake protocol.

7. The method of claim 1, wherein using the TLS session information to set the new TLS connection comprises performing an abbreviated handshake protocol.

8. The method of claim 1, further comprising:
performing a SUPL positioning procedure between the V-SLP and the terminal to calculate a location of the terminal when the new TLS connection is set.

9. The method of claim 1,
wherein using the TLS session information to set the new TLS connection includes:
transmitting receiving, by the V-SPC, a Client Hello message including a Version, a SET-Random, and a sessionID from the terminal; and
sequentially transmitting a Server Hello message including a Version, a V-SLP-Random and a sessionID, a ChangeCipherSpec message and a Finished message from the V-SPC to the terminal; and
wherein the method further comprises sequentially transmitting the ChangeCipherSpec message and the Finished message by the terminal when the Finished message is transmitted from the V-SPC, to thus terminate an abbreviated handshake process.

10. The method of claim 1, further comprising:
transmitting, by the V-SLC, an RLP Standard SUPL Roaming Location Immediate Request (SSRLIA) message including a session ID and a V-SPC address for performing a position calculation to the H-SLP;
transmitting, by the H-SLP, a SUPL RESPONSE message including the session ID and the V-SPC address to the terminal in response to the SUPL START message;
calculating, by the V-SPC, a location of the terminal by performing a SUPL positioning procedure between the V-SPC and the terminal; and
transmitting a SUPL END message from the V-SPC to the terminal when the calculation of the location of the terminal is completed.

11. The method of claim 1, wherein the TLS session information
and the SUPL Start message are included in an RLP SSRLIR message to be transmitted to the V-SLC.

* * * * *